Dec. 15, 1931.  A. J. DIECKMANN  1,837,116
SHUTTER OPERATING DEVICE
Filed Sept. 4, 1929   2 Sheets-Sheet 1
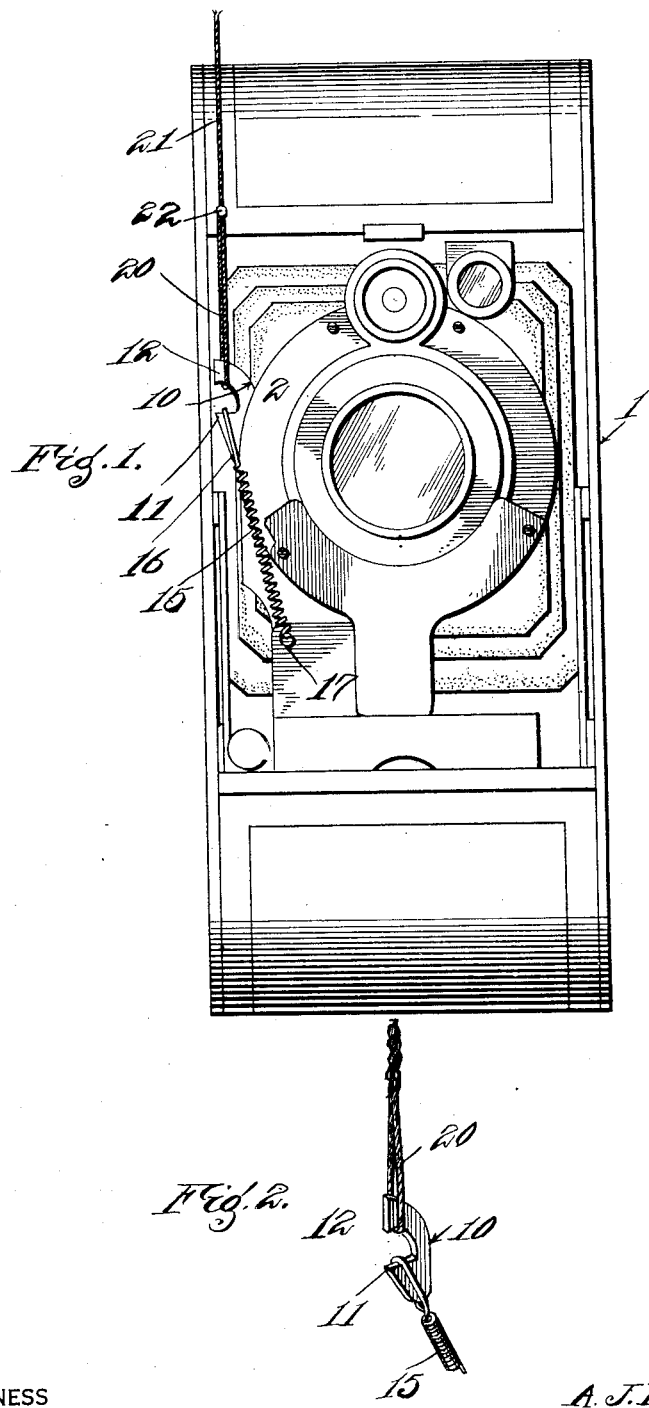
INVENTOR
A. J. Dieckmann.
BY
ATTORNEY
WITNESS Dec. 15, 1931.  A. J. DIECKMANN  1,837,116
SHUTTER OPERATING DEVICE
Filed Sept. 4, 1929  2 Sheets-Sheet 2

WITNESS
F. H. Taylor

INVENTOR
A. J. Dieckmann.
BY Munn & Co.
ATTORNEY

Patented Dec. 15, 1931

1,837,116

UNITED STATES PATENT OFFICE

ARMIN J. DIECKMANN, OF SAGINAW, MICHIGAN

SHUTTER OPERATING DEVICE

Application filed September 4, 1929. Serial No. 390,829.

This invention relates to camera shutters and more particularly to automatic operating means therefor.

A primary object of the invention is to provide a simple and effective fuse controlled camera shutter operator to enable the photographer to leave the camera after focusing and setting it so that he may appear in the picture taken or for any other purpose.

Another object is to so construct such a device that the shutter is held closed against a tensioned opener and when said holding device is released the opener will operate to open the shutter and then become disengaged therefrom permitting the shutter to return to normal closed position.

In carrying out these objects, the invention is susceptible of a wide range of modification without departing from the spirit or sacrificing any of the advantages of the claimed invention; there being shown in the drawings for illustrative purposes a preferred and practical form, in which:

Figure 1 represents a front elevation of a camera equipped with this improvement;

Fig. 2 is a detail perspective view of the attachment with parts broken out;

Figure 3:
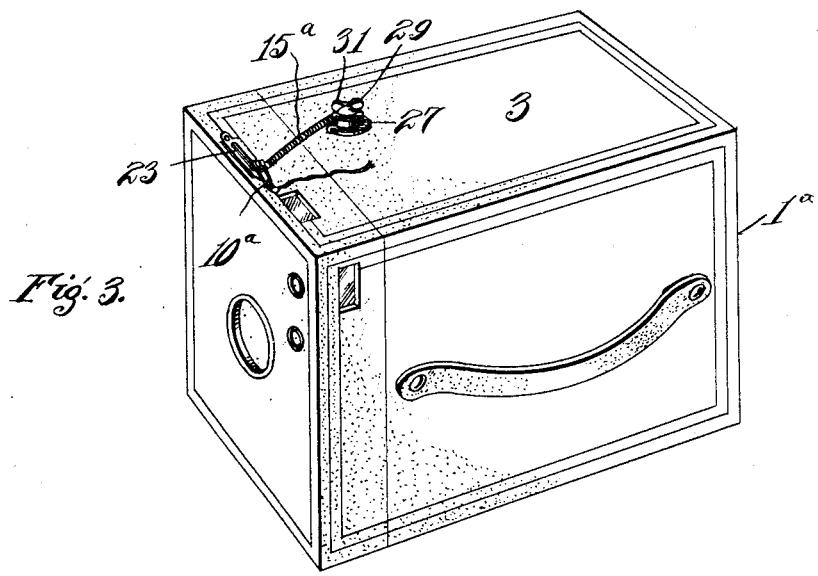
Fig. 3 is a perspective view of a box camera equipped with this improved shutter operator.

In the embodiment illustrated in Figs. 1 and 2 the operator constituting this invention is shown applied to a standard folding camera 1 having the usual automatic shutter 2 provided with the shutter release finger or lever 10. This release lever 10, as shown, has a hook 11 at its lower portion and a hook or catch member 12 at its upper portion. The hooks 11 and 12 are designed to cooperate respectively with a pulling device 15 and a holding device 20 whereby the shutter is held closed against the opening force exerted by the member 15. The hook 11 has its inner wall or space so formed that when the lever 10 is swung into shutter closing position the loop 16 of the pulling device will be interengaged therewith to exert a pull on lever 10 and when said lever swings to shutter opening position under the pull exerted by member 15 the loop 16 of said member will slide off hook 11 and permit lever 10 to close the shutter.

The holding device is in the form of a non-fusible or non-combustible loop combined with a fuse 21 which may be of any desired length according to the time it is desired to have the shutter remain closed after the fuse is lit. A stud 22 is located on the camera at a suitable place to receive the loop 20, it being positioned from the lever 10 a proper distance so that when said loop is engaged with both the stud and the hook 12 the shutter will be held against opening. The fuse 21 which is of any suitable construction such as is ordinarily employed in devices of this character, constitutes a part of the loop 20. The body of the loop 20 is treated with any suitable material, such as lacquer or aluminum paint to render it non-glowing and non-combustible, but the ends of the loop which merge into the fuse proper are left untreated so that they will burn and release the loop from the stud 22 at the proper time. This release of the loop 20 frees the lever 10 and permits it with the shutter 2 to move under the pull exerted by the member 15 thereby opening the spring closed shutter effecting the exposure of the film necessary to take the picture. When the shutter reaches its open position the member 15 is disengaged from the hook 11 incident to the slipping off of the loop 16 from said hook. This is due to the fact that the lever swings down and permits such slipping. Immediately when this release takes place the shutter closes and the camera is ready to be again set for the next exposure.

The shutter opening or pulling device 15 is here shown in the form of a coiled spring attached at one end of the camera as shown at 17 and at its other end carries loop 16 for engagement with the hook 11. The attaching point of the spring 17 is so disposed that when the hook 16 of the spring is engaged with the hook 11 of the lever 10, the lever having been first engaged by loop 20, the spring will be taut or under tension so that it will exert its power to open the shutter when released by the burning of the fuse 21 at the point of its bifurcation where it combines with loop 20.

The loop 20 and fuse 21 is formed by bending a string or other suitable fiber substance so as to bring the ends together and then twisting until loop 20 is formed to the proper size for use as herein mentioned. Then the loop is treated to make it noncombustible, almost to the bifurcation where loop 20 and fuse 21 unite. The string or fiber substance at 21 and bifurcation of loop 20 are treated in any suitable manner to make them a fuse. Then the whole fuse and loop is covered with collodion or other suitable substance to make it clean to handle, stiff enough to hold its shape and to hold the combustible and non-combustible impregnation to the string or fiber substance which forms the body of the loop and fuse and to hold the loop together instead of a knot at bifurcation. I claim for this loop and fuse a new principle because when the fuse burns to and through the loop, the remaining part of loop being non-combustible is not a fire hazard to other combustible substance.

Figures 4, 5:
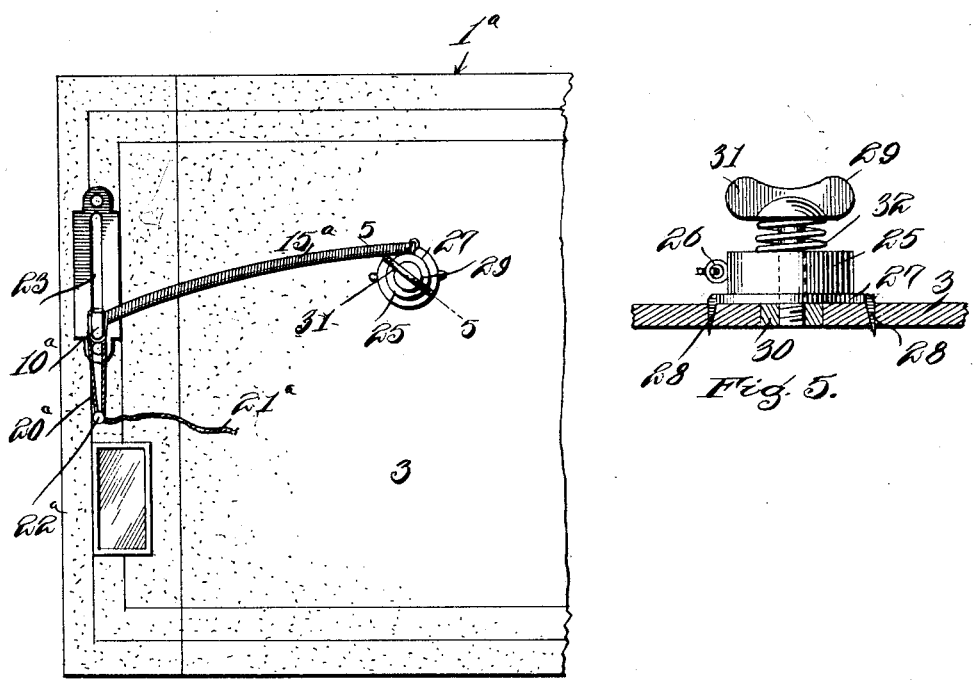
Fig. 4 is a plan view with a portion of the camera broken off.
Fig. 5 is a detail sectional view taken on the line 5—5 of Fig. 4.

In the embodiment illustrated in Figs. 3 to 5 the invention is shown applied to a box camera 1a, the shutter operating finger 10a of which projects through a slot 23 in the top 3 of the camera box near the front face thereof such as is usual in cameras of this character. This finger 10a is constructed similar to that shown in Fig. 2 being equipped with hooks similar to hooks 11 and 12 of said finger for engagement respectively with a spring 15a and with a fuse loop 20a. The spring 15a is so tightly wound as to have a certain amount of rigidity and resiliency, so that when it is swung laterally or as shown in Fig. 4 the tendency will be to straighten out and consequently when it is so straightened it will operate to move the shutter finger 10a carried with the shutter and thus open the shutter to expose the film. The fuse 21a with the loop 20a carried thereby is the same as that shown in the other figures and the loop is engaged with a stud 22a on the camera.

The end of the spring 15a opposite to that which is designed to be engaged with the shutter operated finger is attached to a rotary button 25 here shown equipped with a radially projecting eye 26 for attachment of spring 15a. Thus button 25 is mounted to turn on a washer 27 fixedly secured to the camera top 3 as shown clearly in Fig. 5, prongs 28 being here shown provided for attachment.

A thumb screw 29 extends through the button 25, the washer 27 and has threaded engagement with the camera top, a nut 30 being here shown embedded in said top to receive said screw. Arranged between the winged head 31 of the screw and the top of the button 25 is a coiled spring 32 which exerts its tension to hold the button 25 frictionally engaged with the washer 27 preventing its accidental turning.

The spring 15a is of a sufficient length so that when attached to the shutter finger 10a and to the button 25 with the shutter in closed position, said spring will be bowed longitudinally as shown clearly in Figs. 3 and 4, so that the tension thereof will be sufficient to straighten out and move the shutter finger when said finger is released by the fuse burning through and disengaging the loop 20a therefrom in the manner similar to that above described in connection with the other figures.

In the use of this shutter operator the camera having been focused and the shutter finger 10 or 10a set as shown in Fig. 1 or Figs. 3 and 4 in which position the shutter will be closed the fuse carried loop 20 or 20a is engaged with the upper hook of the finger 10 and said loop also engaged with the stud on the camera so that it will securely hold the shutter against opening. The coiled spring member 15 or 15a is then engaged with the lower hook of the finger and exerts its tension to open the shutter, the fuse loop holding it against such tension and preventing the shutter from opening until the loop is released. When the photographer has so set the camera, he lights the fuse 31 which may be of any desired length according to the time required for the photographer to take his position in the picture or to be away from the camera for any other purpose.

When the burning fuse reaches the loop 20 the end of said loop, which connects with the body of the fuse, being untreated and combustible burns through and disengages the loop 20 from the shutter finger. When this occurs the pull or tension exerted by the spring member 15 or 15a operates to open the shutter against the tension of its spring, not shown, and when so opened the loop 16 of the member 15 will slip off the hook 11 and thus permit the shutter to be opened and closed (snapped) under the action of its own spring, it having been open a sufficient length of time to expose the film to produce the snap shot photograph.

Obviously when this device is not desired to be used the spring member 15 and 15a may be swung out of the way and the camera shutter operated by the lever 10 and 10a in the ordinary manner.

The thumb screw 29 is of course adjustable to vary the tension of the member 25 and its engagement with washer 27.

In the form shown in Figs. 3 and 4 when the device is not desired to be used the wing nut of the screw is turned so as to swing the spring 15a away from the camera shutter finger and permit the camera to be operated as usual.

Without further description it is thought that the features and advantages of the invention will be readily apparent to those skilled in the art, and it will, of course, be understood that changes in the form, proportion and minor details of construction may be resorted to, without departing from the spirit of the invention or the scope as claimed.

I claim:

1. A camera shutter actuating finger, a fuse having a loop for connecting said finger to a support, and a pull exerting member for engagement with said finger and operable in a direction opposite to said loop, said member being automatically operable to move said finger and releasable therefrom when the loop is disengaged from the finger to permit the shutter to assume its normal closed position.

2. In combination with a camera shutter having an actuating finger equipped with oppositely extending hooks; a pull exerting member having a loop for engaging one of said finger hooks and adapted to exert a pull to open the shutter against the tension of its spring, a fuse having a non-combustible loop for engaging the other finger hook to hold the shutter closed against the tension of said pull member, said pull member and fuse loop exerting their force on said finger in opposite directions, said loop being disengageable from the finger hook on the burning of the fuse thereby permitting the shutter finger to swing into open position under the action of said pull member, said pull member being releasable from said finger when so swung and thereby permitting the finger to return with the shutter to normal position.

3. The combination with a support; of a camera shutter actuating finger, a fuse having a loop for connecting said finger to said support, and a pull exerting member for engagement with said finger and operable in a direction opposite to said loop, said pull member and finger having interengageable means whereby when the finger is swung to shutter closing position the member will be retained in engagement with the finger and when said finger is swung to shutter opening position under the pull exerted by said pull member the pull member will be disengaged from said finger allowing the shutter to close.

4. A camera shutter release finger having oppositely extending hooks, a fuse having a loop for connection with one of said finger hooks, a coiled spring pull exerting member having a loop for engagement with the other hook of said finger and operable in a direction opposite to said fuse loop, the wall of the hook engaged by the loop of the pull member being straight to permit the loop engaged therewith to slip off said hook when the finger is swung into shutter opening position thereby permitting the release of the finger after the exposure to permit the shutter to be closed, the fuse loop being disengageable from its position by the burning of the fuse.

ARMIN J. DIECKMANN.